United States Patent
Lin et al.

(10) Patent No.: US 11,693,515 B2
(45) Date of Patent: Jul. 4, 2023

(54) TOUCH MODULE AND TOUCH CIRCUIT THEREOF

(71) Applicant: SITRONIX TECHNOLOGY CORP., Jhubei (TW)

(72) Inventors: Wang-An Lin, Jhubei (TW); Chun-Kuan Wu, Jhubei (TW); Chen-Yuan Yang, Jhubei (TW); Tsung-Han Tsai, Jhubei (TW)

(73) Assignee: Sitronix Technology Corp., Jhubei (TW)

( * ) Notice: Subject to any disclaimer, the term of this patent is extended or adjusted under 35 U.S.C. 154(b) by 0 days.

(21) Appl. No.: 15/955,019

(22) Filed: Apr. 17, 2018

(65) Prior Publication Data

US 2018/0299981 A1    Oct. 18, 2018

Related U.S. Application Data

(60) Provisional application No. 62/486,065, filed on Apr. 17, 2017.

(51) Int. Cl.
*G06F 3/041*    (2006.01)

(52) U.S. Cl.
CPC .......... *G06F 3/04184* (2019.05); *G06F 3/041* (2013.01)

(58) Field of Classification Search
None
See application file for complete search history.

(56) References Cited

U.S. PATENT DOCUMENTS

| 5,621,437 | A | * | 4/1997 | Jeong | G06F 1/3209 |
| | | | | | 345/173 |
| 2009/0251433 | A1 | * | 10/2009 | Park | G06F 1/3215 |
| | | | | | 345/173 |
| 2011/0061947 | A1 | * | 3/2011 | Krah | G06F 3/041 |
| | | | | | 713/320 |
| 2017/0023995 | A1 | * | 1/2017 | Liepold | G06F 1/32 |

FOREIGN PATENT DOCUMENTS

| CN | 102103429 A | 6/2011 |
| CN | 103809803 A | 5/2014 |
| CN | 103853405 A | 6/2014 |
| CN | 203882299 U | 10/2014 |
| CN | 105518590 A | 4/2016 |
| CN | 106471455 A | 3/2017 |
| TW | 507158 B | 10/2002 |
| TW | 200949638 A | 12/2009 |
| TW | 201411445 A | 3/2014 |

OTHER PUBLICATIONS

Patent Search Report Issued by a Foreign Patent Office.
Office Action dated Nov. 4, 2020 for corresponding CN Patent Application 201810346479.2.

* cited by examiner

*Primary Examiner* — Brian M Butcher
(74) *Attorney, Agent, or Firm* — Rosenberg, Klein & Lee

(57) ABSTRACT

The present invention provides a touch module, which comprises a touch panel, an analog front end circuit, and a microcontroller circuit. The touch panel generates a plurality of sensing signals. The analog front end circuit is coupled to the touch panel, generates a state signal, and generates a plurality of touch detecting signals according to the plurality of sensing signals. The microcontroller circuit is coupled to the analog front end circuit, generates one or more touch location signal according to the plurality of touch detecting signals, and enters the next switching state according to the state signal when the switching state is changed.

13 Claims, 5 Drawing Sheets

TOUCH MODULE AND TOUCH CIRCUIT THEREOF

FIELD OF THE INVENTION

The present invention relates generally to a touch module, and particularly to a touch circuit of a touch module.

BACKGROUND OF THE INVENTION

In the development process of touch devices, users' requirements on touch devices are gradually increasing. In a general touch device, the microcontroller unit and the analog front end circuit are responsible for data transmission only. They do not perform coordination for operation. Consequently, the microcontroller unit might interfere the operation stability of the analog front end circuit and lower the signal-to-noise ratio (SNR) performance. In addition, according to the relevant prior art for touch technologies, for example, the China Patent Publication Numbers CN 101937662B and CN 102999210B, the U.S. Pat. No. 9,619,083 B1, and US Patent Publication Numbers US 2013/0222335 A1 and US 2016/0124544 A1, the problem of the microcontroller unit in a general touch device interfering the analog front end circuit is not solved.

Accordingly, the present invention provides a touch circuit of a touch module for improving the SNR performance.

SUMMARY

An objective of the present invention is to provide a touch circuit of a touch module, which lowers the interference of the microcontroller circuit on the analog front end circuit and thus improving the SNR of the analog front end circuit.

The present invention discloses a touch module, which comprises a touch panel, an analog front end circuit (AFE), and a microcontroller circuit. The touch panel generates a plurality of sensing signals. The analog front end circuit is coupled to the touch panel, generates a state signal, and generates a plurality of touch detecting signals according to the plurality of sensing signals. The microcontroller circuit is coupled to the analog front end circuit, generates one or more touch location signal according to the plurality of touch detecting signals, and enters the next switching state according to the state signal when the switching state is changed.

The present invention discloses a touch circuit of a touch module, which comprises an analog front end circuit. The analog front end circuit generates a state signal and receives a plurality of sensing signals for generating a plurality of touch detecting signals. The state signal indicates that the analog front end circuit is in an operating state or an idle state.

DETAILED DESCRIPTION

In the specifications and subsequent claims, certain words are used for representing specific devices. A person having ordinary skill in the art should know that manufacturers might use different nouns to call the same device. In the specifications and subsequent claims, the differences in names are not used for distinguishing devices. Instead, the differences in techniques as whole are the guidelines for distinguishing. In the whole specifications and subsequent claims, the word "comprising" is an open language and should be explained as "comprising but not limited to". Besides, the word "couple" includes any direct and indirect connection. Thereby, if the description is that a first device is coupled to a second device, it means that the first device is connected to the second device directly, or the first device is connected to the second device via other device or connecting means indirectly.

In order to make the structure and characteristics as well as the effectiveness of the present invention to be further understood and recognized, the detailed description of the present invention is provided as follows along with embodiments and accompanying figures.

Figure 1:
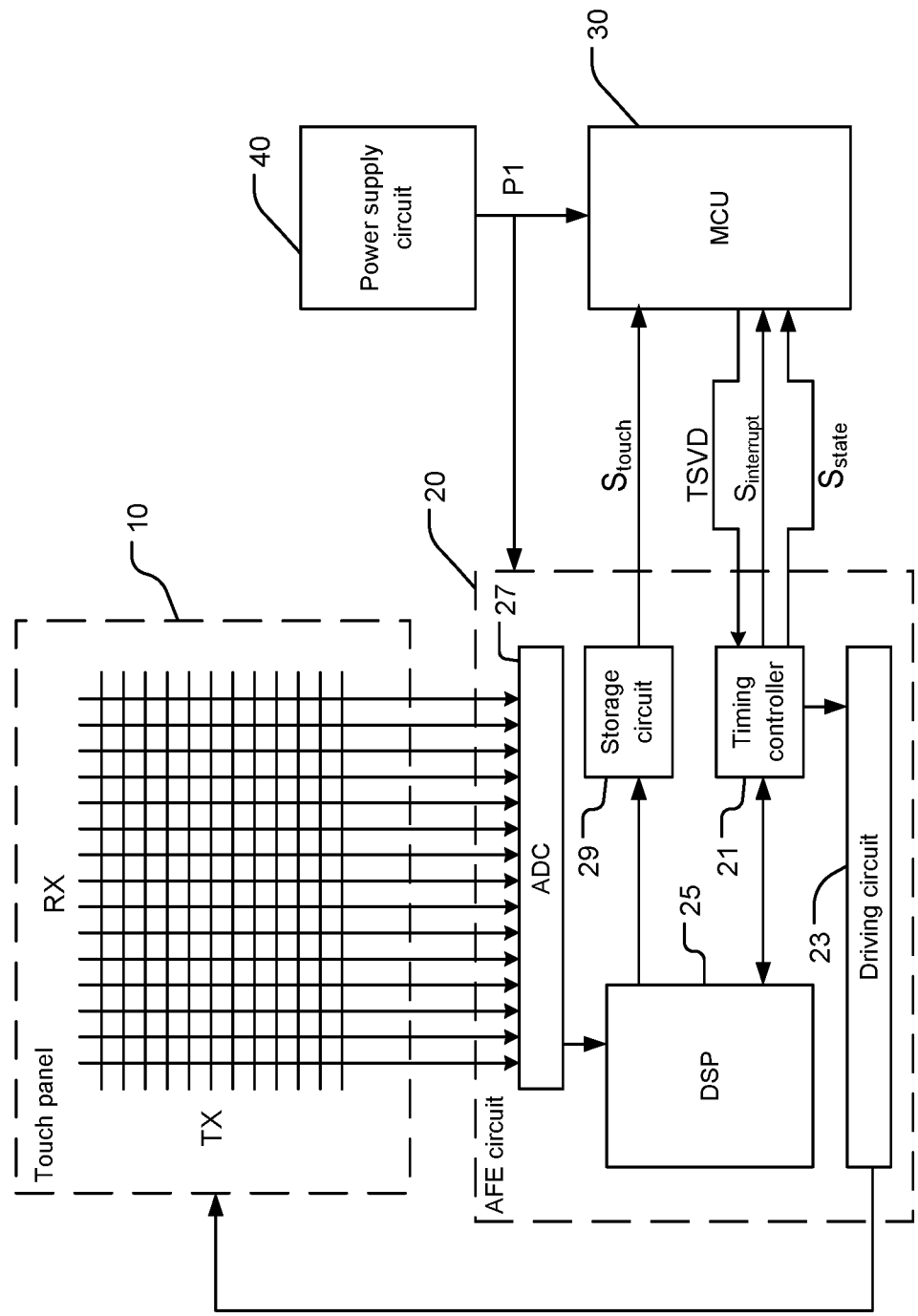
FIG. 1 shows a schematic diagram of the touch module according to an embodiment of the present invention.

Please refer to FIG. 1, which shows a schematic diagram of the touch module according to an embodiment of the present invention. As shown in the figure, the touch module comprises a touch panel 10, which includes a plurality of driving electrodes TX and a plurality of sensing electrodes RX. The plurality of driving electrodes TX receives a plurality of driving signals. The plurality of sensing electrodes RX generates a plurality of sensing signals. The operation of an object, such as a finger or a stylus, on the touch panel 10 will influence the levels of the plurality of sensing signals. In addition, the touch module shown in FIG. 1 comprises a touch circuit, which includes an analog front end (AFE) circuit 20, a microcontroller circuit (MCU) 30, and a power supply circuit 40. The AFE circuit 20 is coupled to the touch panel 10 for receiving the plurality of sensing signals. The MCU 30 is coupled to the AFE circuit 20. The power supply circuit 40 is coupled to the AFE circuit 20 and the MCU 30 for supplying a power source P1 to the AFE circuit 20 and the MCU 30.

Please refer again to FIG. 1. The AFE circuit 20 can include a timing controller (TCON) 21, a driving circuit 23, a digital signal processor (DSP) 25, an analog-to-digital converter (ADC) 27, and a storage circuit 29. The storage circuit 29 can be a random access memory (RAM) or other types of storage media. The details will not be described further. The timing controller 21 is coupled to the driving circuit 23 and the DSP 25 for generating an initial signal to the driving circuit 23 and the DSP 25. After receiving the initial signal, the driving circuit 23 generates the plurality of driving signals to the plurality of driving electrodes TX. The ADC circuit 27 receives the plurality of sensing signals and converts the plurality of sensing signals to digital forms, and thus generating a plurality of digital signals. Then the plurality of digital signals is transmitted to the DSP 25.

After receiving the initial signal generated by the timing controller 21, the DSP 25 starts to process the signal. Thereby, the DSP 25 is coupled to the ADC circuit 27 and receives the digital sensing signals for further generating a plurality of touch detecting signals $S_{touch}$. The DSP 25 is coupled to the storage circuit 29 and generates the plurality of touch detecting signals $S_{touch}$ to the storage circuit 29. Thereby, the storage circuit 29 stores the plurality of touch detecting signal $S_{touch}$.

Furthermore, in order to coordinate the operations of the MCU 30 and the AFE circuit 20, the MCU 30 can send a touch synchronization vertical detection (TSVD) signal to the AFE circuit 20 for controlling the AFE circuit 20 to enter an operating state for performing the operations including generating the plurality of driving signals, receiving the plurality of sensing signals, and processing the plurality of sensing signals. When the operation of the AFE circuit 20 is finished and in an interrupt state, an interrupt signal $S_{interrupt}$ can be transmitted to the MCU 30 for enabling the MCU 30 to read the plurality of touch detecting signals $S_{touch}$ timely. Please refer to FIG. 1. The timing controller 21 receives the TSVD signal TSVD and generates the initial signal to the driving circuit 23 and the DSP 25. After generating the plurality of touch detecting signals $S_{touch}$ to the storage circuit 29, the DSP 25 generates a finish signal to the timing controller 21. Then, the timing controller 21 will generate the interrupt signal $S_{interrupt}$ to the MCU 30.

Besides, according to the embodiment in FIG. 1, the timing controller 21 is disposed in the AFE circuit 20. Nonetheless, for other requirements, the timing controller 21 can be alternatively disposed in the MCU 30. According to the present embodiment, the location of the timing controller 21 is not limited. Likewise, the MCU 30 can be disposed outside the AFE circuit 20 or integrated with the AFE circuit 20. In other words, while designing a touch chip for the touch panel 10, the touch chip can include the AFE circuit 20, or include the AFE circuit 20 and the MCU 30.

Please refer again to FIG. 1. After receiving the interrupt signal $S_{interrupt}$, the MCU 30 will read the plurality of touch detecting signals $S_{touch}$ from the storage circuit 29 of the AFE circuit 20. The interrupt signal $S_{interrupt}$ can be generated after the AFE circuit 20 has received (or sensed) the plurality of sensing signals of a full, ½, or ⅓ frame of the touch panel 10. It can be designed according to requirements and not limited by the present embodiment. In addition, the interrupt signal S interrupt generated by the timing controller 21 can be generated according to the finish signal generated by the DSP 25 or according to the predetermined time required to generate a ½ or ⅓ frame. Namely, a person having ordinary skill in the art can determine whether the interrupt signal $S_{interrupt}$ is generated according to the finish signal.

Moreover, the AFE circuit 20 will generate a state signal $S_{state}$, which includes a first voltage level and a second voltage level. The first voltage level can be used for indicating that the AFE circuit 20 is in an operating state; the second voltage level can be used for indicating that the AFE circuit 20 is in an idle state. The first voltage level can be a pulse of the state signal $S_{state}$. In addition, the correspondence of the voltage levels described above is just an embodiment of the present invention, not used for limiting the present invention. Thereby, according to the present embodiment, after receiving the state signal $S_{state}$ in the first voltage level, the MCU 30 will not change the switching state, such as changing from the operating state to the closing state (stop operation) or from the closing state to the operating state (start operation). After receiving the state signal $S_{state}$ in the second voltage level, the MCU 30 will change the switching state (the operating state or the closing state). In the operating state, the MCU 30 can perform various signal processes, for example, starting to read the plurality of touch detecting signals $S_{touch}$ of the storage circuit 29 or identifying the touch location according to the plurality of touch detecting signals $S_{touch}$.

Accordingly, the MCU 30 can acquire the state, such as the operating or idle state as described above, of the AFE circuit 20 according to the state signal $S_{state}$ for determining the timing for changing its own switching state and hence preventing the operation of MCU 30 interfering the operation stability and SNR performance of the AFE circuit 20 or preventing mutual interference between the operations of the MCU 30 and the AFE circuit 20. The interrupt signal $S_{interrupt}$ in FIG. 1 is used for determining the moment for the MCU 30 to capture the plurality of touch detecting signals $S_{touch}$ generated by the AFE circuit 20. On the other hand, the state signal $S_{state}$ generated by the AFE circuit 20 is used for indicating the operation state of the AFE circuit 20 before entering the interrupt state. Thereby, while changing the switching state, the MCU 30 determines when to perform the change according to the state signal $S_{state}$ for reducing the interference for the AFE circuit 20. Consequently, the SNR performance of the AFE circuit 20 can be improved.

Figure 2:
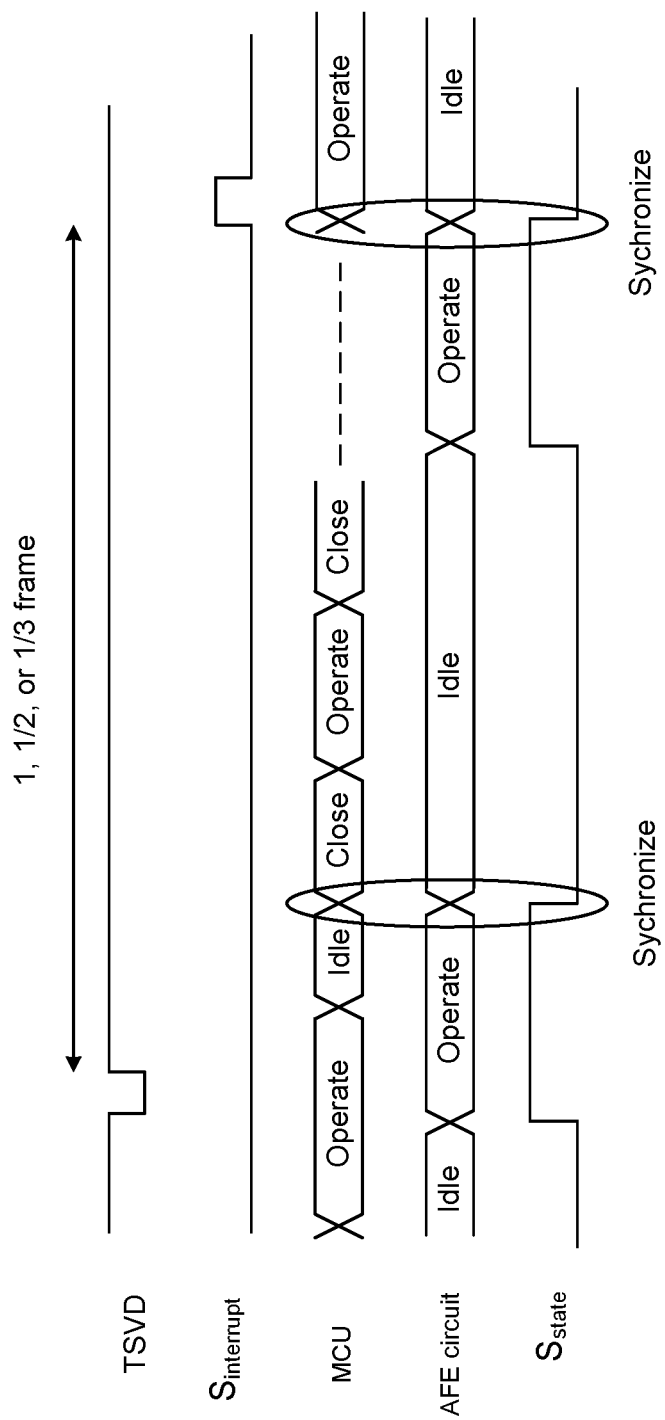
FIG. 2 shows a timing diagram of the microcontroller circuit and the analog front end circuit in the touch circuit according to the first embodiment of the present invention.

Please refer to FIG. 2, which shows a timing diagram of the microcontroller circuit and the analog front end circuit in the touch circuit according to the first embodiment of the present invention. As shown in the figure, the initial state of the MCU 30 is the operating state while the initial state of the AFE circuit 20 is the idle state. In addition, for the state signal $S_{state}$, a high-level pulse (the first voltage level) indicates that the AFE circuit 20 is in the operating state while a low level (the second voltage level) indicates that the AFE circuit 20 is in the idle state. Furthermore, the initial states of the AFE circuit 20 and the MCU 30 are not limited to the embodiment in FIG. 2.

According to FIG. 2, if the MCU 30 is about to change the switching state, such as changing from the operating state to the closing state or from the closing state to the operating state, as the state signal $S_{state}$ has not changed from the high-level pulse to the low level, instead of changing from the operating state to the closing state directly, the MCU 30 will enter the idle state first for avoiding significant changes in the current or voltage of the power source P1 during the transition of the switching state. The significant changes will interfere the operation of the AFE circuit 20. Contrarily, as the state signal $S_{state}$ is changed from the high-level pulse to the low level, it means that the AFE circuit 20 changes from the operating state to the idle state. At this moment, the MCU 30 will be synchronized with the state change of the AFE circuit 20 and change from the idle state to the closing state for completing change in the switching state.

In addition, when the AFE circuit 20 is in the idle state, the MCU 30 can change its switching state freely. While changing the switching state, the MCU 30 can change from the operating state to the closing state directly, without needing to enter the idle state before the closing state. Moreover, when the MCU 30 is in the closing state and the state signal $S_{state}$ is in the high-level pulse, the MCU 30 will not enter the operating state. Please refer again to FIG. 2. The interval between the generation of the TSVD signal TSVD and the generation of the interrupt signal $S_{interrupt}$ can accommodate, but not limited to, a full, ½, or ⅓ frame.

Figure 3:
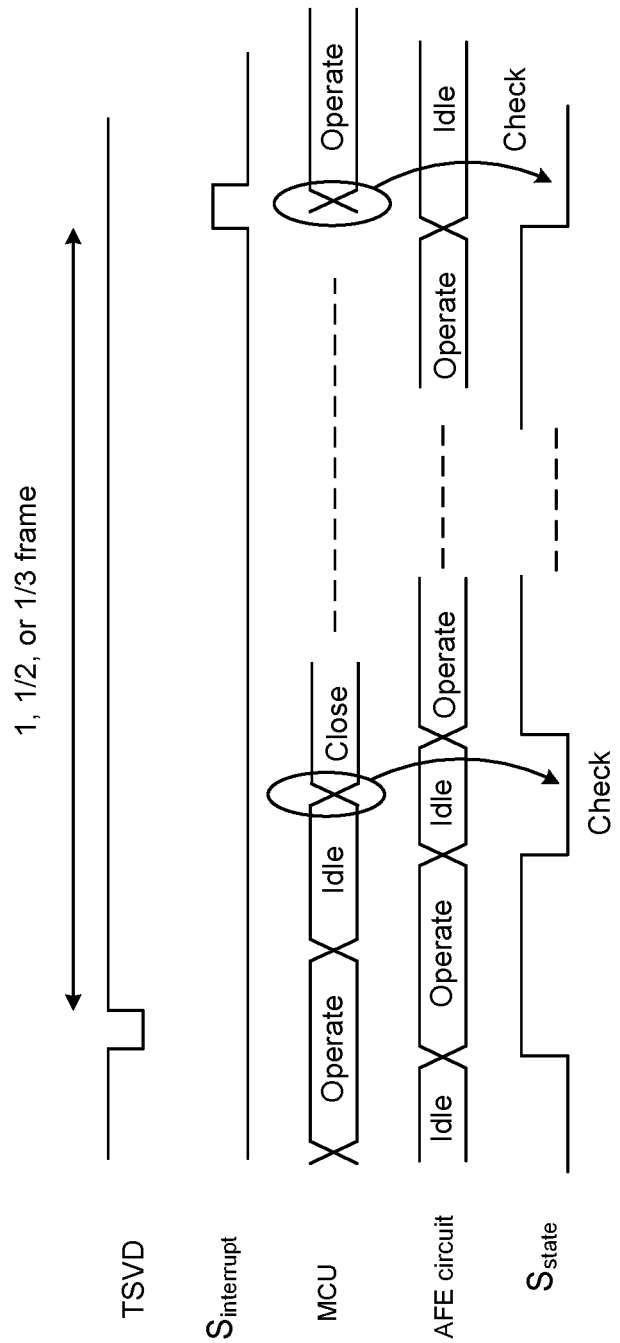
FIG. 3 shows a timing diagram of the microcontroller circuit and the analog front end circuit in the touch circuit according to the second embodiment of the present invention.

Please refer to FIG. 3, which shows a timing diagram of the microcontroller circuit and the analog front end circuit in the touch circuit according to the second embodiment of the present invention. As shown in the figure, the MCU 30 may be not synchronized with the operation of the AFE circuit 20. Instead, it can determine whether to enter the next switching state while changing the switching state according to (by checking) the voltage level of the state signal $S_{state}$ generated by the AFE circuit 20 only. In other words, in the period when the state signal $S_{state}$ is the low level (the second voltage level), the MCU 30 can change its state freely.

Figure 4:
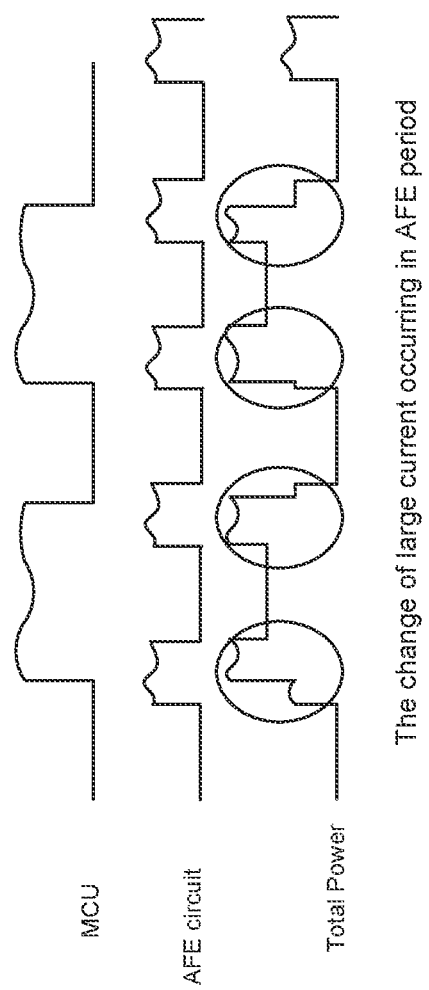
FIG. 4 shows waveforms of interference on the analog front end circuit by a microcontroller unit according to the prior art.
Figure 5:
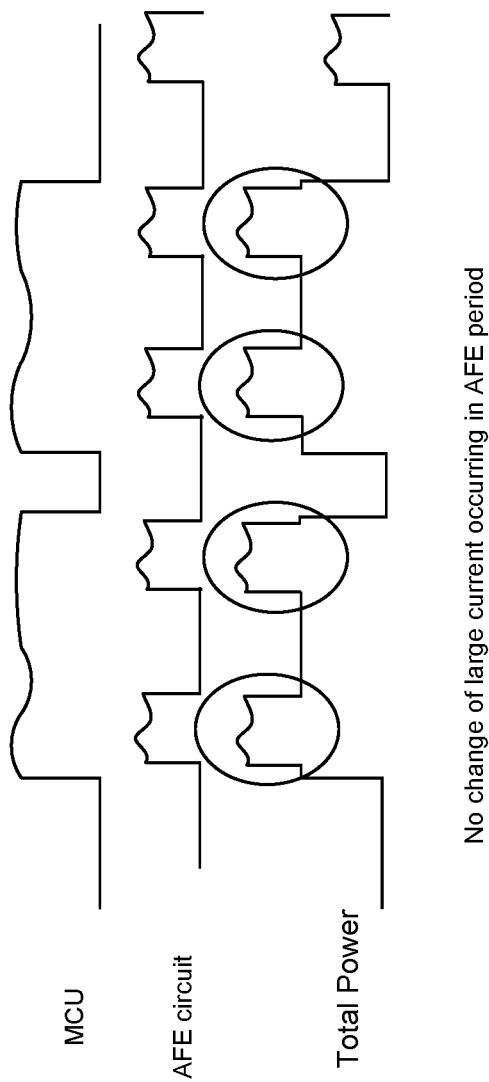
FIG. 5 shows waveforms of reduced interference on the analog front end circuit by a microcontroller circuit according to the present invention.

Please refer to FIG. 4, which shows waveforms of interference on the analog front end circuit by a microcontroller unit according to the prior art. As shown in the figure, the power required for the AFE circuit 20 to enter the operating state is less than for the MCU 30. Thereby, when the operations of the AFE circuit 20 and the MCU 30 are not controlled (coordinated), if the AFE circuit 20 enters the operating state before the MCU 30 does, the total power supplied by the power supply circuit 40 will have a greater change owing to the operation state (start and stop operations) of the MCU 30. Consequently, the total power supplied by the power supply circuit 40 will interfere the operation of the AFE circuit 20. Contrarily, please refer to FIG. 5, which shows waveforms of reduced interference on the analog front end circuit by a microcontroller circuit according to the present invention. As shown in the figure, when the operations of the AFE circuit 20 and the MCU 30 are controlled (coordinated) according to the state signal $S_{state}$, the MCU 30 will not change its switching state to enter the operating state or the closing state as the AFE circuit 20 is in the operating state. Thereby, the variation of the total power supplied by the power supply circuit 40 is less than the variation of the total power in FIG. 4. Hence, the interference on the operation of the AFE circuit 20 can be reduced.

Accordingly, in a touch circuit or other circuits, such as a display driving circuit, the technology according to the present invention can be applied to two circuit having different operating currents for avoiding mutual interference or avoiding interference of the circuit having a larger current to the one having a smaller current.

To sum up, the present invention discloses a touch module, which comprises a touch panel, an analog front end circuit, and a microcontroller circuit. The touch panel generates a plurality of sensing signals. The analog front end circuit is coupled to the touch panel, generates a state signal, and generates a plurality of touch detecting signals according to the plurality of sensing signals. The microcontroller circuit is coupled to the analog front end circuit, generates one or more touch location signal according to the plurality of touch detecting signals, and enters the next switching state according to the state signal when the switching state is changed.

The present invention discloses a touch circuit of a touch module, which comprises an analog front end circuit. The analog front end circuit generates a state signal and receives a plurality of sensing signals for generating a plurality of touch detecting signals. The state signal indicates that the analog front end circuit is in an operating state or an idle state.

The invention claimed is:

1. A touch module, comprising:
   a touch panel, generating a plurality of sensing signals;
   an analog front end circuit, coupled to said touch panel, generating a state signal, and generating a plurality of touch detecting signals according to said plurality of sensing signals; and
   a microcontroller circuit, coupled to said analog front end circuit, generating one or more touch location signals according to said plurality of touch detecting signals, and entering a next switching state according to said state signal while changing a switching state;
   wherein said state signal indicates an operating state and an idle state of said analog front end circuit, said microcontroller circuit enters the next switching state according to said state signal when said analog front end circuit is in said idle state or changes to said idle state.

2. The touch module of claim 1, wherein said state signal includes a plurality of voltage level changes; a first voltage level and a second voltage level of said state signal indicate said operating state and said idle state of said analog front end circuit, respectively; said microcontroller circuit enters an operating state or a closing state when said analog front end circuit is in said idle state; and said analog front end circuit receives said plurality of sensing signals while said analog front end circuit is in said operating state.

3. The touch module of claim 1, wherein said analog front end circuit includes:
   an analog-to-digital converter, coupled to said touch panel, and generating a plurality of digital signals according to said plurality of sensing signals;
   a digital signal processor, coupled to said analog-to-digital converter, and generating said plurality of touch detecting signals according to said plurality of digital signals; and
   a storage circuit, coupled to said digital signal processor, storing said plurality of touch detecting signals, and said microcontroller circuit coupled to said storage circuit to read said plurality of touch detecting signals.

4. The touch module of claim 1, wherein said analog front end circuit includes:
   a timing controller, generating an initial signal;
   a driving circuit, coupled to said timing controller and said touch panel, and generating a plurality of driving signals to said touch panel according to said initial signal; and
   a digital signal processor, coupled to said timing controller, and generating said plurality of touch detecting signals according to said initial signal and a plurality of digital signals.

5. The touch module of claim 1, and further comprising a power supply circuit, coupled to said analog front end circuit and said microcontroller circuit, and supplying a power source to said analog front end circuit and said microcontroller circuit.

6. The touch module of claim 1, wherein said analog front end circuit generates an interrupt signal and said microcontroller circuit receives said plurality of touch detecting signals according to said interrupt signal.

7. The touch module of claim 6, wherein said interrupt signal indicates that said analog front end circuit finishes generating said plurality of touch detecting signals; and said analog front end circuit receives said plurality of sensing signals while said analog front end circuit is in said operating state.

8. A touch circuit of a touch module, comprising an analog front end circuit, said analog front end circuit generating a state signal, and generating a plurality of touch detecting signals according to a plurality of sensing signals, said state signal indicating an operating state and an idle state of said analog front end circuit;
   wherein a microcontroller circuit enters a next switching state according to said state signal when said analog front end circuit is in said idle state or changes to said idle state.

9. The touch circuit of a touch module of claim 8, wherein said analog front end circuit includes a timing controller; said analog front end circuit generates said plurality of touch detecting signals according to said plurality of sensing signals of a touch panel; and said timing controller generates an interrupt signal after said analog front end circuit generates said plurality of touch detecting signals.

10. The touch circuit of a touch module of claim 8, and further comprising said microcontroller circuit, coupled to said analog front end circuit.

11. The touch circuit of a touch module of claim 8, wherein said analog front end circuit is coupled to said microcontroller circuit; and said microcontroller circuit generates one or more touch location signals according to said plurality of touch detecting signals and enters the next switching state according to said state signal while changing a switching state.

12. The touch circuit of a touch module of claim 8, wherein said analog front end circuit includes:
   an analog-to-digital converter, coupled to a touch panel, and generating a plurality of digital signals according to said plurality of sensing signals;
   a digital signal processor, coupled to said analog-to-digital converter, and generating said plurality of touch detecting signals according to said plurality of digital signals; and
   a storage circuit, coupled to said digital signal processor, storing said plurality of touch detecting signals.

13. The touch circuit of a touch module of claim 8, wherein said analog front end circuit includes:
   a timing controller, generating an initial signal;
   a driving circuit, coupled to said timing controller and a touch panel, and generating a plurality of driving signals to said touch panel according to said initial signal; and
   a digital signal processor, coupled to said timing controller, and generating said plurality of touch detecting signals according to said initial signal and said plurality of sensing signals.

* * * * *